3,395,675
DOG RESTRAINING DEVICE
Anne Minor Fowlkes, 731 Biltmore Way,
Coral Gables, Fla. 33134
Filed Sept. 12, 1966, Ser. No. 578,523
1 Claim. (Cl. 119—120)

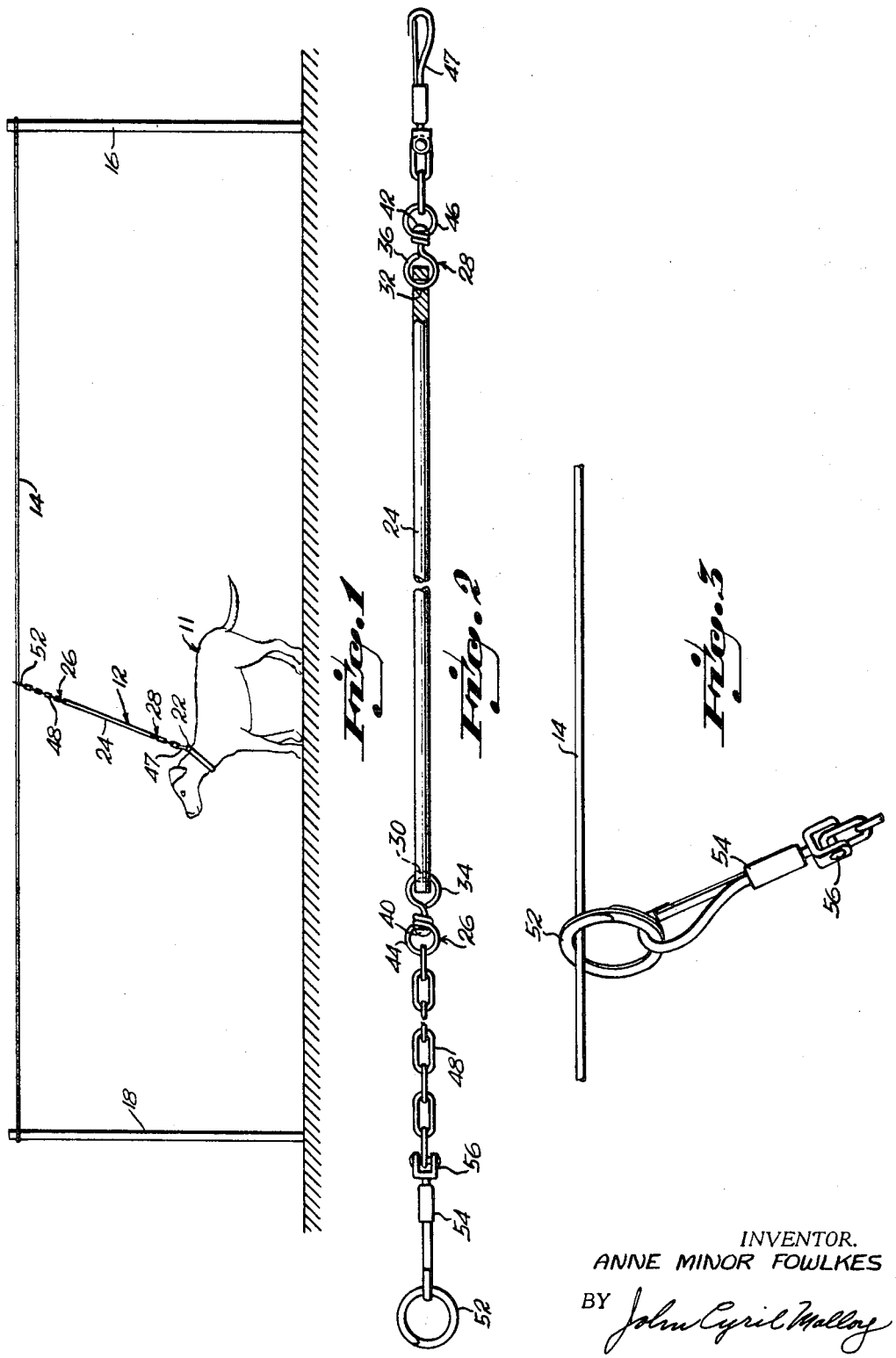

ABSTRACT OF THE DISCLOSURE

An animal restraining or tethering device for permitting free movement of the animal along the path of travel defined by a suspended, elevated line and including an enlarged ring element circumposed thereabout and having free movement therealong, and a restraining device comprising an intermediate, relatively rigid rod having transverse aperture extending through opposite ends thereof, each of said apertures having pivotally mounted therein swivel ring assemblies comprising a pair of rings connected by a headed stem permitting the rings to have relative movement thereabout through 360° of rotation, snap means connected to one swivel ring assembly for detachable engagement with an animal collar, and a link chain and second snap means connected to the other swivel ring assembly for detachable engagement with the enlarged ring on said elevated line.

---

This invention relates to a dog restraining device, and, more particularly, to a dog restraining device which includes a solid elongate member to be connected adjacent to the collar of a dog and intermediate the length of a chain so that the dog will not be able to choke himself by winding the chain around his neck.

In accordance with the foregoing, it is an object of this invention to provide a device to restrain a dog and to limit movement of the dog with respect to a line connected to span the distance between a first and a second support which includes an elongate rod, a length of chain which length has a first end and a second end and swivel link means to connect the first end of the chain and the rod and a snap connected to the other end of the chain with a split ring connected thereto which is adapted to ride along a line and the other end of the rod having a snap means to connect to the collar of a dog.

It is another object of this invention to provide a dog restraining device which is simple and inexpensive to manufacture and which is strong and durable and otherwise well adapted to permit a dog to have a limited range of movement on a line which will include a member to protect the dog from being choked by wrapping of the chain around his neck.

In accordance with these and other objects which will become apparent hereinafter, the instant invention will now be described with reference to the accompanying drawings in which there is illustrated a preferred embodiment thereof.

In the drawings:

FIGURE 1 is an elevation view illustrating the instant invention in use attached to a dog;

FIGURE 2 is an enlarged view of the dog restraining device; and

FIGURE 3 is an enlarged view of that portion of FIGURE 1 with the arrowed line 3—3 therearound.

Referring to the drawings, wherein like reference characters designate like or corresponding parts of the different views, and referring particularly to FIGURE 1, it will be seen that the numeral 11 generally designates a dog which is connected by means of the device 12 for a limited range of movement along a line 14 between a first and a second support 16 and 18.

Referring to the device, it will be seen that it is adapted to be connected to the collar of the dog and more particularly to a ring 22 on the collar of the dog.

The device, it will be seen, includes an elongate rod member 24 which is provided with a swivel link 26 and 28 with one of the links being at each end. It will be seen that there is provided on each end of the rod a hole 30 and 32 which accommodate the rings 34 and 36 of the swivel links which are composed of the links 34 and 36 which are interconnected by a headed stem 40 and 42 to distalmost rings 44 and 46 which connect through chain links, in the case of the lower end to a snap device 47 to connect to the ring at the collar of the dog. The other end of the swivel link is connected to a length of chain 48 which may be as indicated in FIGURE 1 or may be somewhat longer but preferably not long enough so that the dog will be able to get it wound around his neck. The distalmost end of the chain links 48 is provided with a snap and a ring. The ring is adapted to be traveled along the line by the dog and the snap is to releasably connect the split ring 52 to the line, the snap being designated by the numeral 54 and connected to the end of the chain by a swivel joint 56.

It will be seen that by reason of this invention a dog may be connected to a line so that he will have a limited range of movement between the supports.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claim so as to embrace any and all equivalent apparatus and articles.

What is claimed is:

1. An animal restraining device comprising in combination:

an elevated line defining a path of travel therealong;
an enlarged ring element circumposed about said line and having free movement therealong; and
a restraining device comprising
an elongated, relatively rigid rod member having a transverse aperture adjacent opposite ends thereof,
a pair of swivel ring assemblies comprising a pair of ring elements, one of said pair of ring elements including a headed stem extending radially from one side thereof, the other ring element being journaled on said headed stem and having free rotation thereabout through 360°,
one ring element of said pair of ring assemblies each extending through a respective transverse aperture in said rod member and circumposed about the adjacent end thereat and having pivotal movement in said transverse apertures,
snap means comprising a link extending through the other ring element of one of said swivel ring assemblies for detachable connection to an animal collar, a link chain having a terminal link at one end extending through the other ring element of said other swivel ring assembly; and second snap means for detachable connection to said enlarged ring circumposed about said elevated line for suspending the restraining device, said second snap means comprising a swivel joint pivotally connected to the terminal link at the other end of said link chain.

References Cited

UNITED STATES PATENTS

| | | | |
|---|---|---|---|
| 225,404 | 3/1880 | Maxey | 119—120 |
| 628,950 | 7/1899 | Magruder | 119—117 |
| 1,509,781 | 10/1924 | Roth | 119—109 X |

FOREIGN PATENTS

| | | |
|---|---|---|
| 245,930 | 1/1926 | Great Britain. |

HUGH R. CHAMBLEE, *Primary Examiner.*